T. S. PATTERSON.
EXTRACTOR.
APPLICATION FILED AUG. 7, 1916.

1,378,608.

Patented May 17, 1921.
2 SHEETS—SHEET 1.

Inventor.
Thomas S. Patterson
by his Attorneys
Howson & Howson

T. S. PATTERSON.
EXTRACTOR.
APPLICATION FILED AUG. 7, 1916.
1,378,608.
Patented May 17, 1921.
2 SHEETS—SHEET 2.
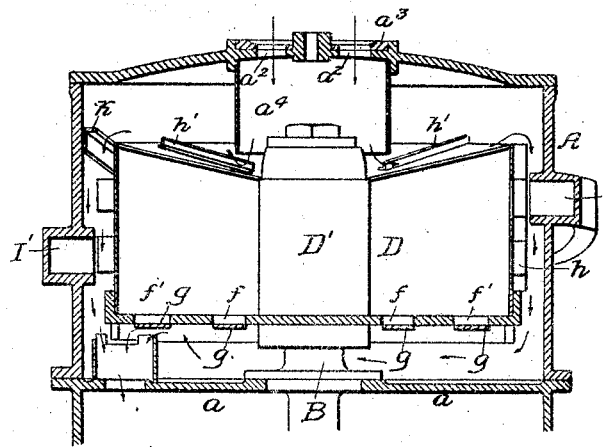
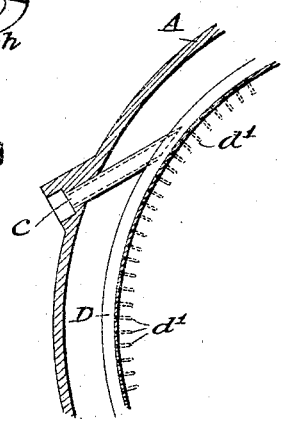
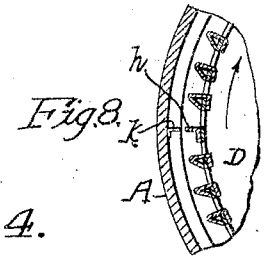
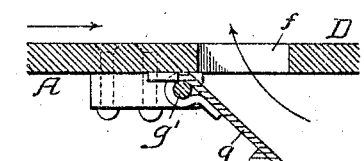
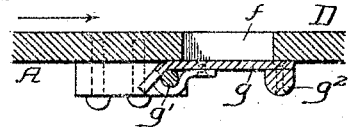
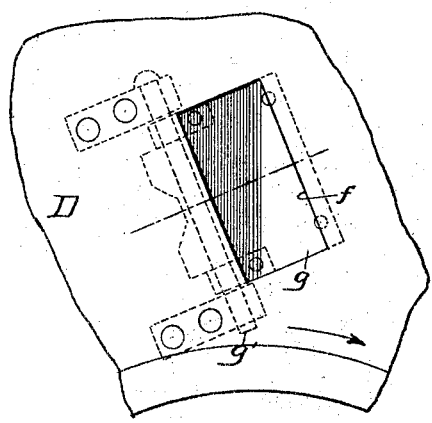
Inventor:
Thomas S. Patterson
by his Attorneys
Howson & Howson

UNITED STATES PATENT OFFICE.

THOMAS S. PATTERSON, OF ROSEMONT, PENNSYLVANIA, ASSIGNOR TO F. ROYAL HAMMETT, OF PHILADELPHIA, PENNSYLVANIA.

EXTRACTOR.

1,378,608.

Specification of Letters Patent.

Patented May 17, 1921.

Original application filed February 26, 1912, Serial No. 679,932. Divided and this application filed August 7, 1916. Serial No. 113,608.

*To all whom it may concern:*

Be it known that I, THOMAS S. PATTERSON, a subject of the King of Great Britain and Ireland and the Isle of Man, (having declared my intention of becoming a citizen of the United States,) and a resident of Rosemont, county of Montgomery, State of Pennsylvania, have invented certain Improvements in Extractors, (being a division of application filed February 26th, 1912, under Serial No. 679,932,) of which the following is a specification.

This application is a division of the application which resulted in Patent No. 1,193,600, dated August 8th, 1916.

The object of the invention is to improve the extracting apparatus so that, when the basket is rotated at a given speed, the moisture will be driven off of the material by incoming air, which will also carry off any steam that may accumulate in the casing.

In the accompanying drawings:

Fig. 3 is a diagrammatic view showing the flow of air through the machine when the valve at the top is opened;

Fig. 4 is a sectional view showing one of the weighted valves on the bottom of the basket opened;

Fig. 5 is a view, similar to Fig. 4, showing the valve closed;

Fig. 6 is a plan view showing the location of the valve;

Fig. 7 is a sectional view on the line 7—7, Fig. 1, and

Fig. 8 is a sectional plan view on the line 8—8, Fig. 1.

Figure 1:
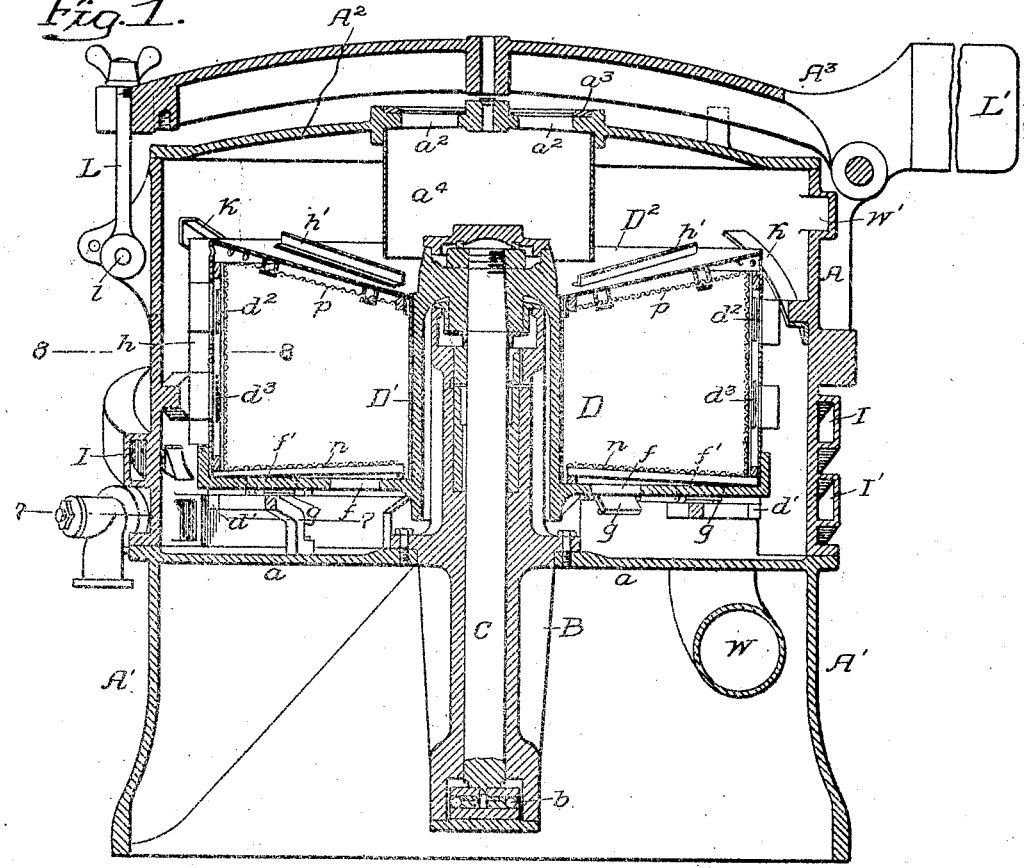
Figure 1 is a vertical sectional view of my improved extracting machine.
Figure 2:
Fig. 2 is a sectional view of the cover of the basket.

Referring to the drawings, A is a cylindrical casing. This casing is mounted on a frame A', shaped in any suitable manner. The top of the frame in this instance forms the bottom $a$ of the washing chamber. Mounted on the bottom portion $a$ is the standard B supporting the vertical shaft C which carries the basket D. The standard B extends to a point near the floor and has a ball bearing $b$ for the lower end of the shaft. The upper portion of the standard B extends into the chamber in the ordinary manner and has bearings for the upper end of the said shaft. The basket has a hollow center post D' of sufficient diameter to inclose the shaft and its standard and on the end of this center post is a socket to receive the tapered end of the shaft. The detail construction of the bearings and the means of attaching the basket to the shaft may be modified without departing from the essential features of the invention.

In the present instance, the basket has a series of turbine blades $d'$ secured to the bottom thereof near the periphery, Fig. 7. The steam pipe $c$ is located so as to project the steam against these turbine blades and thus rotate the basket at the speed desired, the exhaust steam escaping into the chamber in which the basket is rotated. In the present instance, in the wall of the basket are two series of openings $d^2$ and $d^3$, spaced apart as indicated, and in the bottom of the basket are two series of openings $f$ and $f'$. The object of providing these openings is to allow water under pressure to gain access to the interior of the basket at different points and to open the material when the material is being washed, where the apparatus is used as a combined washing and extracting machine. Each opening $f$ in the present instance is quadrangular in form and set at an angle as clearly shown in Fig. 6.

In the walls of the casing A are passages or conduits I, I' through which the water is admitted under pressure to the casing. One set of passages leads to a point opposite one set of openings $d^2$ and another set of passages leads to a point in line with the openings $d^3$ in the basket. These passages communicate at their inlet end with the bottom of the chamber in the present instance. The water passes from the chamber formed by the casing and through the passages I, I' and as the basket rotates additional water, either heated or not, may be added to this circulating water, as desired. Thus, there is a complete circulation of water in the basket and this circulation is so regulated that the water enters the basket first at one point and then at another point in order to keep the material, during the washing operation, in motion and to expose every portion of the same to the cleansing action of the water.

The bottom openings $f$, $f'$ in the basket are closed by valves $g$, Figs. 4, 5, and 6, and these are pivoted at one side of the openings at $g'$ and at the other end of each valve is a weight $g^2$. When the basket is rotating slowly then the valves are open, as in Fig. 4, and the water can flow freely through the openings, but when the speed of rotation is increased then the valves are automatically closed, as in Fig. 5, due to centrifugal force, which prevents the circulation of water through the openings. When the apparatus is used for washing, then the basket is slowly rotated and the valves are opened, but when it is used for extracting the speed of the basket is increased and the valves are either entirely closed or partially closed, so as to completely cut off the flow of steam into the basket or to control the flow thereof into the basket.

It will be noticed, upon referring to Fig. 6, that as the basket rotates in the direction of the arrow the pivots for the valves are at the upper side of the opening. Each valve has a stop at the back which limits the opening of the valve to the angle illustrated in Fig. 4.

When the basket is traveling slowly the valves are opened and the water is picked up by the valves and forced into the basket, except when the valves are closed by the cams. The weight is sufficient to hold the valves open against centrifugal force when the basket is rotating slowly, but when the rotation of the basket is increased for extracting then the centrifugal force overcomes gravity, and the valves close, as in Fig. 5, as it will be noticed that the weight on the valves is farther away from the center of rotation when the valve is closed than when it is opened.

On the periphery of the basket is a series of vertical fins or blades $h$ by which the water between the basket and the casing is kept in active motion. Within the basket, in the present instance, is a cage $n$ and the side of the cage is formed of wire gauze and the bottom of the cage is also preferably formed of wire gauze so that while the cage retains the material it allows for the free flow of water through the basket. Secured to the under side of the cover $D^2$ of the basket is a wire gauze lining $p$ spaced from the cover to allow for the free flow of liquid. On the upper surface of the cover is a series of blades $h'$. The cage is made so that it can be bodily removed from the basket when desired.

Secured to the inner wall of the casing A are inclined blades $k$. These blades are set at an angle and the blades $h$ on the basket are preferably arranged vertically. The water, as it is carried around by the action of the blades $h$ of the basket, is caused to have a downward movement due to the inclined blades $k$ on the casing.

Communicating with the bottom of the casing is an exhaust pipe W, which may be closed by a suitable valve. W' is an overflow pipe.

Pivoted to the casing is an arm $A^3$ carrying a cover $A^2$. The arm has a counterbalance L' and is secured to the casing in the present instance by a clamp bolt L pivoted to the casing at $l$ and arranged to enter a slot in the bar. A nut on the threaded portion of the bolt engages the bar and firmly secures the cover in the closed position. Depending from the cover $A^2$ of the casing is a shell $a^4$, which extends down to a point near the blades $h'$ on the cover of the basket and in the cover of the casing are openings $a^2$ closed by a rotary valve $a^3$. The object of this construction is to allow air to enter through the casing when the water has been drawn off so as to prevent steam from entering the basket. The air is driven by the blades on the basket toward the inner wall of the casing and travels down the wall of the casing, due to the inclined blades on the casing, and as it circulates in the chamber, due to the rotation of the basket, it is directed by the wall which surrounds the outlet opening through the outlet opening and away from the chamber, carrying with it any steam that may escape from the turbine jet and which was not condensed, and any material extracted from the contents of the basket will also flow out through the opening W.

If the machine has been used for washing and it is desired to use it as an extractor, then the circulating steam pipes are closed, as well as the water pipes, and the exhaust valve is opened, allowing the water to flow to waste, then the valve controlling the turbine jet is opened to the full position to allow a certain amount of steam to enter and drive the basket at a higher speed for the purpose of extracting the water from the material. The valves $g$ at the bottom openings $f$ close automatically, due to centrifugal force, as the speed of rotation of the basket increases. The valve $a^3$ in the cover of the apparatus is opened to allow air to be drawn into the casing and to be driven down by the action of the blades and to carry with it any steam which may tend to accumulate in the basket and, as the outlet is still open, this air will be carried away from the machine. As I preferably use cold air it will gradually cool the machine and the material under treatment and tend to condense the steam as it leaves the turbine.

After a given length of time, the machine is stopped and the cage, with the material, is removed from the basket and other material is inserted in its place and the operation is repeated.

I claim:

1. The combination in an extractor, of a casing; a basket rotatably mounted in the casing; a steam pipe extending into the casing; an opening in the bottom of the casing; a central, contracted opening at the top of the casing; a series of radial blades on the top of the basket; and blades on the periphery of the basket, said blades being so arranged that, as the basket is rotated, air will be drawn through the inlet opening to the top of the basket and will be forced by the top blades of the basket toward the periphery and will be drawn down between the basket and the casing and will flow through the outlet opening in the bottom of the casing, carrying with it any steam that may accumulate in the casing.

2. The combination of a casing; a basket rotatably mounted in the casing; a steam pipe extending into the casing; an opening in the bottom of the casing; a central, contracted opening in the top of the casing and a shell leading from said opening toward the basket; radial blades on the top of the basket; blades on the periphery of the basket; and blades on the inner wall of the casing arranged to draw the air down between the basket and the casing, the air flowing through the bottom outlet opening carrying with it any steam that may accumulate in the casing.

THOMAS S. PATTERSON.